Aug. 9, 1932. C. H. FARLEY 1,870,720
VENTILATOR
Filed March 24, 1931

INVENTOR.
Cyrus H. Farley.
BY Henry L. Chenery.
ATTORNEY.

Patented Aug. 9, 1932

1,870,720

UNITED STATES PATENT OFFICE

CYRUS H. FARLEY, OF PORTLAND, MAINE

VENTILATOR

Application filed March 24, 1931. Serial No. 524,919.

The invention hereinafter to be described relates to devices employed for ventilating purposes, particularly of that class capable of being installed on the glass pane of a window.

The conventional or ordinary type of window pane ventilator is built on the rotary shutter principle, the movable as well as the stationary elements having sector shape openings which when in relative registration permit of either ingress or egress of air through the ventilator.

To successfully ventilate an average sized room these rotary style ventilators must be of considerably large diameters, due to the fact that the agregate area of the openings must of necessity be somewhat less than one-half of the full transverse area of the ventilator. This tends to give them a very bulky appearance, especially when installed on the small window panes—which is coming to be the vogue in present day architecture, and, furthermore, necessitates a large increase in the amount of material required to construct them.

Moreover, a serious objection in the operating of these rotary devices is that in stormy weather rain or snow can freely enter the interior space being ventilated and in extremely cold weather ice or sleet forming on the shutters render them difficult of actuation.

My present conception contemplates a construction embodying a fixed cylindrical portion secured to the glass pane in a very simple manner. To this fixed element is hinged a cover located exteriorly of the pane and swinging outwardly from the cover seat on the cylindrical portion.

This cover serves not only to tightly close the ventilator when it is seated on the fixed portion but further acts to deflect rain or snow and largely prevent the entrance of these elements into the room when the cover is positioned to open the ventilator.

Constructed in this manner a much smaller ventilator than one of the rotary type of the same capacity is possible because the whole inside area is available for the passage of air therethrough.

Another advantage residing in my improved ventilator is the very convenient and simple construction employed to adjust the cover to any desired degree of opening and positively lock it in place, the locking means to secure the cover on its seat on the fixed portion of the ventilator being particularly effective as a strain is brought to bear on the working parts causing the cover to close with substantially an air tight fit.

Other objects and advantages concern the method of mounting the device on the glass pane—no holes, other than the main ventilating aperture, being required. Glass panes with this ventilating aperture cut to standard dimensions can be supplied by any grazier in case replacement of the pane becomes necessary; and the means employed to lock the glass disc in the cover frame is so simple that neither screws, bolts or tools of any sort are necessary to securely bind it in place.

The character of the invention may best be understood by reference to the description found in the following specification when taken in connection with the accompanying drawing in which is disclosed an embodiment which, at the present time, I consider preferable to other possible forms in which the invention might be carried out. In the drawing—

Figure 1:
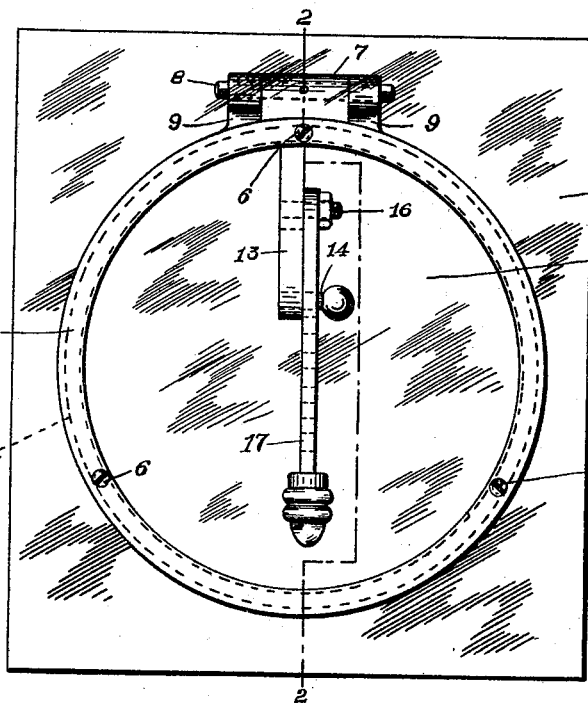
Fig. 1 is an elevation of my ventilator as viewed from the inside of a room.
Figure 6:
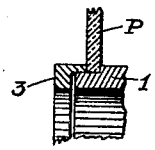
Figure 7:
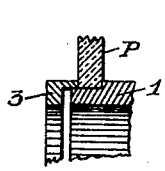
Figure 8:
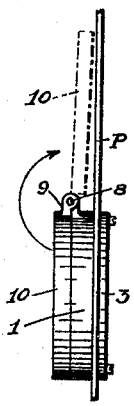
Figures 2, 3, 5:
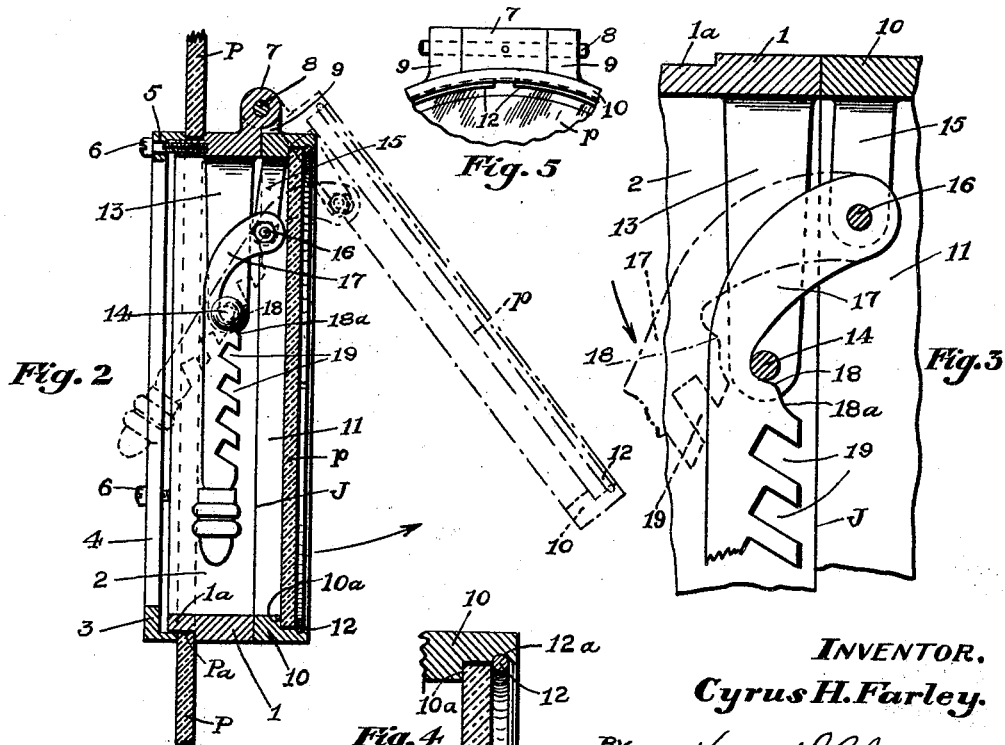
Fig. 2 is a sectional elevation of the same, taken on line 2—2, Fig. 1.
Fig. 3 illustrates, on an enlarged scale, the mechanism which firmly locks the cover on its seat.
Figure 4:
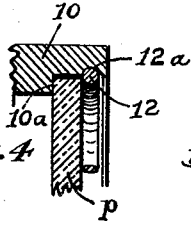

Fig. 4, shown also on an enlarged scale, depicts the means to secure the glass disc in the cover;

Fig. 5 is a fragmentary face view of the outside of the ventilator;

Figs. 6 and 7 show the device mounted, respectively, on thin and thick panes of glass, and Fig. 8 shows a different application of the ventilator. Similar reference characters are employed to identify like parts in all the different views of the drawing.

Referring to the drawing, P represents a glass pane in which is a circular aperture Pa, within which the device is mounted, and which constitutes the only hole required to be made in the pane.

On the exterior side of the pane is a cylindrical body member 1 having an opening 2 therethrough, the inner end of the member, as at 1a, being reduced in size to substantially fill the opening Pa and extend somewhat beyond the inner face of the pane P.

On the inner side of the pane, or that nearest the interior space in the room, is an annular clamp ring 3 having an opening 4 of substantially the same diameter as the opening 2 in the member 1.

At spaced intervals around the face of the clamp ring are holes 5 through which the screws 6 pass to make screw threaded engagement with the body member 1. It is thus obvious that the pane P is securely bound between the face of the circumferential rim of the member 3 and the shoulder formed by cutting away the periphery of the member 1, at 1a, see Fig. 2.

On the top of the body member 1 is a hinge, comprising the ear 7, integral with the member 1, the hinge pin 8 and the two ears 9, 9, the latter integral with the cover frame 10. When the cover is in closed position an air tight joint is made at J.

The outer end of the cover frame 10, in which is an opening 11, is constructed as shown in Fig. 4. The glass disc p thrusts on the shoulder 10a and is held against displacement from the cover structure by the impingement against its outer face of an open wire spring ring 12 which, when assembling the parts, is slightly compressed and then allowed to spring into the groove 12a effectively locking the pane in place.

From the upper interior surface of the member 1 is suspended an arm 13 having near its lower end a laterally extending pin 14, and on the cover frame 10, in alignment with the arm 13, depends another arm 15 having on one side a stud 16 on which is pivotally mounted a lever 17.

The lever 17 is the element by which actuation of the cover for the ventilator is accomplished. It is pivotally fulcrumed on the stud 16 from which it swings and is provided with a cammed locking hook 18 and a plurality of diagonally disposed notches 19.

By reference to Fig. 3 it will be observed that, when the lever is swung downwardly and forwardly from its position shown in dotted lines to that depicted in full lines, the surface 18a first engages the pin 14 and upon continuing its movement the cammed surface 18 passes under the pin until finally the latter is seated within the crotch of the hook, in doing which there is created a slight strain between the members 14 and 16 tending to draw them together. This has the effect of bringing the cover tightly on to its seat J on the member 1 insuring a close, air-tight joint between the two members, 1 and 10.

When the cover 10 is in a position which closes the opening through the ventilator the lever 17 stands in a substantially vertical position, as seen in full lines in Fig. 2; when the cover is swung open the lever assumes an inclined position and one of the several notches 19 is made to engage the pin 14 to hold the cover rigidly fixed. In its outwardly inclined position (see dotted lines, Fig. 2) the cover is well adapted to shed rain or snow and deflect it from the opening through the ventilator.

A very valuable feature embodied in the device concerns its universal character with respect to its capacity to be installed on panes of different thicknesses without in any way requiring structural changes in the ventilator parts. In Figs. 6 and 7 the device is shown mounted, respectively, on two panes of widely varying thicknesses and it is well to observe that in both instances the corresponding parts are identical. This, obviously, is of great advantage, especially from the manufacturer's standpoint, for it avoids the necessity of supplying several different models to cover all requirements.

While I have shown the ventilator of circular form it is apparent that other shapes, such as rectangular, hexagonal or octagonal, might be employed and the device function properly.

In Fig. 8 I have shown a somewhat different application of my invention, illustrating it as it would be used in connection with the conversation hole in the window of outside ticket vending booths for theatres or the like, the lever in this instance omitted, preferably, and the cover 10 placed on the inside of the window pane within easy access of the attendant.

The extremely large capacity of the ventilator, its external dimensions being considered; the facilities provided to exclude the elements—rain or snow, when the ventilator is open during stormy weather; its adaptability for service on very small or widely varying thicknesses of window pane; its convenience in operation and its ability to provide a weather proof joint when the cover is closed, all constitute a summation of the chief characteristic and outstanding features of my invention.

What I claim and desire to secure by Letters Patent is:

1. A ventilator applicable for use on a window pane having but a single aperture therein, comprising a cylindrical body member disposed on the outer side of said pane, a reduced portion on the inner end of said body member extending into the aperture in said pane, a clamp ring on the inner side of said pane, screws adapted to secure said clamp ring to said body member, said pane being interposed, a cover frame, an arm on said cover frame, a lever pivotally connected to said arm, an arm on said body member, a pin laterally disposed on said last mentioned arm, near its lower end, and a cammed hook on said lever adapted to engage said pin with a tensional strain tending to firmly seat said cover frame on the face of said body member.

2. A ventilator comprising in combination with a window pane having but a single aperture therethrough, a cylindrical body member disposed on the weather side of said pane, an angular clamp ring on the indoor side of said pane, means to secure said clamp ring to said body member, said means being confined to a space within the bounds of the aperture in said pane, a cylindrical cover frame hinged to the top side of said body member and adapted, when said ventilator is closed, to seat on the outer face of said body member, a lever pivotally connected to said cover frame, an arm depending from the interior of said body member, a pin laterally disposed on said arm, a cammed hook on said lever adapted, when said lever stands in a perpendicular position, to engage said pin and hold said cover frame on its seat under a tensional strain, a plurality of diagonally disposed notches on said lever adapted, singly, to engage said pin and hold said cover in any one of various angular positions relative to its seat on said body member, an enlarged bore on the outer end of said cover frame, a glass disc seated in said bore, a circumferential groove in said bore adjacent to and outwardly of said glass disc, and an expansible open wire ring adapted to be sprung into said groove whereby said glass disc may be retained within said cover frame.

In testimony whereof I affix my signature.

CYRUS H. FARLEY.